US009663865B2

(12) United States Patent
Wang et al.

(10) Patent No.: US 9,663,865 B2
(45) Date of Patent: May 30, 2017

(54) CATALYST STRUCTURE FOR ELECTROLYSIS OF WATER AND METHOD OF FORMING THE SAME

(71) Applicant: National Taiwan University of Science and Technology, Taipei (TW)

(72) Inventors: Chen-Hao Wang, Taipei (TW); Guan-Cheng Chen, Taipei (TW); Kai-Chin Wang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 14/988,706

(22) Filed: Jan. 5, 2016

(65) Prior Publication Data

US 2017/0051418 A1 Feb. 23, 2017

(30) Foreign Application Priority Data

Aug. 20, 2015 (TW) .............................. 104127071 A

(51) Int. Cl.
*B01J 23/745* (2006.01)
*B01J 23/75* (2006.01)
*C25B 11/04* (2006.01)
*C25B 1/04* (2006.01)

(52) U.S. Cl.
CPC ............ *C25B 11/0478* (2013.01); *C25B 1/04* (2013.01)

(58) Field of Classification Search
CPC ................................ B01J 23/745; B01J 23/75
USPC ................................................. 502/326, 338
See application file for complete search history.

(56) References Cited

U.S. PATENT DOCUMENTS

| 1,949,089 | A | * | 2/1934 | Strong | .................... | C10G 47/04 |
| | | | | | | 208/112 |
| 2,488,560 | A | * | 11/1949 | Reiltlinger | ............. | B01J 23/745 |
| | | | | | | 502/300 |
| 2014/0087937 | A1 | * | 3/2014 | Liu | .......................... | B01J 31/38 |
| | | | | | | 502/11 |
| 2014/0150855 | A1 | | 6/2014 | Inoue et al. | | |
| 2015/0021194 | A1 | | 1/2015 | Sheehan et al. | | |

FOREIGN PATENT DOCUMENTS

WO 2014/140826 A2 9/2014

OTHER PUBLICATIONS

J. T. Chen, "Structure and electrocatalytic properties of Co(OH)2 nanosheet," a dissertation for master's degree of engineering in University of Science and Technology of China, pp. 8-11, 16-17, May 15, 2015.

X. L. Sun, "Fabrication, characterization, and photovoltaic application of Semiconducting Fe2O3 Thin Films deposited by Pulsed Laser Deposition," Dissertation Submitted to Hangzhou Dianzi University for the Degree of Master, pp. 10-13, Dec. 2009.

(Continued)

*Primary Examiner* — Cam N. Nguyen
(74) *Attorney, Agent, or Firm* — CKC & Partners Co., Ltd.

(57) ABSTRACT

The disclosure provides a catalyst structure for electrolysis of water. The catalyst structure includes a ferric oxide support and a plurality of cobalt-containing compound catalysts. The plurality of cobalt-containing compound catalysts attach to a surface of the ferric oxide support. The disclosure also provides a method of forming a catalyst structure for electrolysis of water.

4 Claims, 5 Drawing Sheets

(56) References Cited

OTHER PUBLICATIONS

Z. Jin, P. Li, X. Huang, G. Zeng, Y. Jin, B. Zheng, D. Xiao, "Three-dimensional amorphous tungsten-doped nickel phosphide microsphere as an efficient electrocatalyst for hydrogen evolution", Journal of Materials Chemistry A, 2 (2014) 18593-18599.

P. Li, Z. Jin, D. Xiao, "A one-step synthesis of Co-P-B/rGO at room temperature with synergistically enhanced electrocatalytic activity in neutral solution", Journal of Materials Chemistry A, 2 (2014) 18420-18427.

J. Wang, D. Gao, G. Wang, S. Miao, H. Wu, J. Li, X. Bao, "Cobalt nanoparticles encapsulated in nitrogen-doped carbon as a bifunctional catalyst for water electrolysis", Journal of Materials Chemistry A, 2 (2014) 20067-20074.

Y. Zhan, C. Xu, M. Lu, Z. Liu, J.Y. Lee, "Mn and Co co-substituted $Fe_3O_4$ nanoparticles on nitrogen-doped reduced graphene oxide for oxygen electrocatalysis in alkaline solution", Journal of Materials Chemistry A, 2 (2014) 16217-16223.

* cited by examiner

CATALYST STRUCTURE FOR ELECTROLYSIS OF WATER AND METHOD OF FORMING THE SAME

RELATED APPLICATIONS

This application claims priority to Taiwan Application Serial Number 104127071, filed Aug. 20, 2015, which is herein incorporated by reference.

BACKGROUND

Field of Invention

The instant disclosure relates to a catalyst structure for electrolysis of water and a method of forming the same. More particularly, the present disclosure relates to a catalyst structure including ferric oxide support and cobalt-containing compound catalyst and a method of forming the same.

Description of Related Art

Electrolysis of water is an eco-friendly method for hydrogen evolution reaction (HER) and oxygen evolution reaction (OER). That is, water can be converted into hydrogen and oxygen by electric potential. Compared with hydrogen obtained by pyrolysis or steam reforming in traditional industry, the hydrogen generated by electrolysis having higher purity is unnecessary to be further purified and can be used directly. The volume and cost of apparatus for electrolysis are less than traditional industry. Moreover, during electrolysis of water, environmentally harmful by-product may not be produced and the electrolytic method is more eco-friendly thereby.

The hydrogen obtained by electrolysis is versatile. For example, it can be used as fuel of hydrogen fuel cell or thermal power generation. The heating value of hydrogen is 141.8 $MJkg^{-1}$ which is 2.6 times larger than natural gas, 3 times larger than gasoline and 3.93-9.45 times larger than coal. The combustion product is only water and environmentally harmful by-product may not be generated. Therefore, use of hydrogen energy achieves not only the goal of electric storage but also the fulfillment of eco-friendly concepts. Hydrogen energy has unlimited potential at the present time. Further, the oxygen obtained by electrolysis of water has medical uses and can be used in oxyacetylene welding or iron and steel smelting. The applicability of oxygen is diverse. Therefore, electrolysis of water is a promising method for generating hydrogen and oxygen.

However, the most difficult thing in electrolysis of water is too much energy consumption which keeps up the cost of electrolysis. Accordingly, how to reduce the energy consumption to keep the cost down is popular research topic at the present time. One method to reduce the energy consumption is coating catalysts over electrode to reduce the electrical potential required to be overcome during electrolysis. The past literatures indicated that iron-containing, cobalt-containing and nickel-containing compound catalysts can reduce the electrical potential required to overcome in electrolysis. However, these catalysts are magnetic, such that these catalysts easily cluster together, as a result, the phenomenon is called cluster effect. The cluster effect makes the reaction area of catalysts smaller and the efficiency of catalysts worse. Moreover, the past literatures also use nobel metals. Pt or Ir, as catalyst for electrolysis of water. The nobel metals have high efficiency but high cost as well. In view of the above problems, there is need to provide a new catalyst structure and a method of forming the same.

SUMMARY

The disclosure provides a catalyst structure for electrolysis of water and a method of forming the same. The catalyst structure for electrolysis of water includes a ferric oxide support and a plurality of cobalt-containing compound catalysts attaching to a surface of the ferric oxide support. The catalyst structure can reduce an onset potential during electrolysis of water and promote an efficiency of electrolysis. Further, the method of forming the catalyst structure has many advantages, for example, low cost, fast synthesis, high yield, simple process, short reaction time and so on and has market potential.

The instant disclosure provides a catalyst structure for electrolysis of water. The catalyst structure includes a ferric oxide support and a plurality of cobalt-containing compound catalysts. The plurality of cobalt-containing compound catalysts attach to a surface of the ferric oxide support.

In various embodiments of the instant disclosure, the ferric oxide support has a nondense structure.

In various embodiments of the instant disclosure, the nondense structure is a flocculent structure, a fleeced ball-like structure or a steel wool-like structure.

In various embodiments of the instant disclosure, a portion of the ferric oxide support is exposed in between the plurality of cobalt-containing compound catalysts.

In various embodiments of the instant disclosure, the plurality of cobalt-containing compound catalysts are cobalt-containing oxide catalysts, cobalt-containing hydroxide catalysts or a combination thereof.

In various embodiments of the instant disclosure, a material of the plurality of cobalt-containing compound catalysts is cobalt hydroxide.

The instant disclosure provides a method of forming a catalyst structure including the following steps. A first solution including ferric chloride and oxalic acid is provided. The first solution is heated to form ferric oxide. The ferric oxide and a cobalt-containing compound catalyst are mixed.

In various embodiments of the instant disclosure, mixing the ferric oxide and the cobalt-containing compound catalyst includes the following steps. A second solution including the ferric oxide and cobalt chloride is provided. The second solution is adjusted to alkaline. The second solution is heated.

In various embodiments of the instant disclosure, the first solution and the second solution are heated by microwave assisted hydrothermal method.

In various embodiments of the instant disclosure, a weight ratio of ferric oxide to cobalt chloride is 3:55-3:65.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
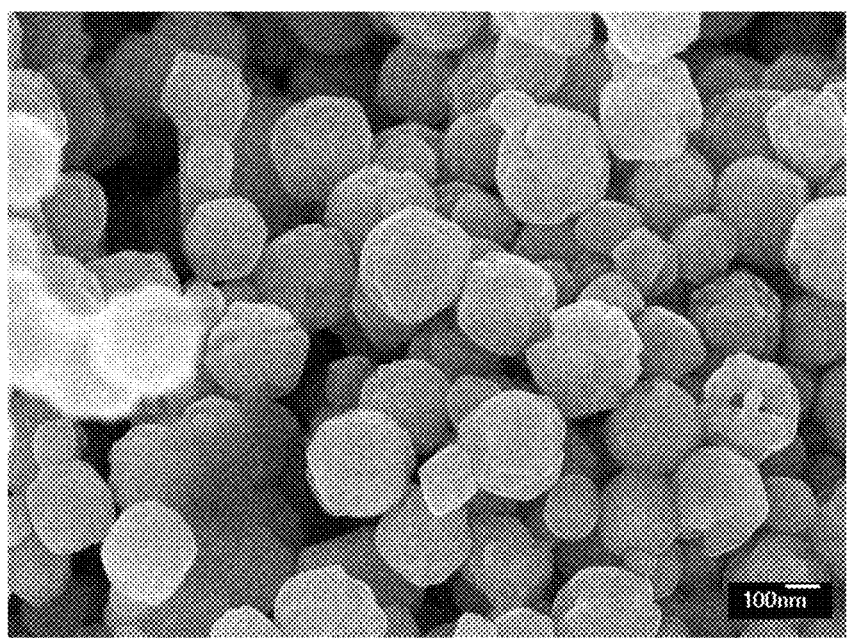
FIG. 1A shows a scanning electron microscope (SEM) image of a ferric oxide support according to one embodiment of the instant disclosure.

The following embodiments are disclosed with accompanying diagrams for detailed description. For illustration clarity, many details of practice are explained in the following descriptions. However, it should be understood that these details of practice do not intend to limit the instant disclosure. That is, these details of practice are not necessary in parts of embodiments of the instant disclosure. Furthermore, for simplifying the drawings, some of the conventional structures and elements are shown with schematic illustrations.

As used herein, the terms "comprising," "including," "having," "containing," "involving," and the like are to be understood to be open-ended, i.e., to mean including but not limited to.

The singular forms "a," "an" and "the" used herein include plural referents unless the context clearly dictates otherwise. Reference throughout this specification to "one embodiment" or "an embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments.

According to one embodiment of instant disclosure, a catalyst structure for electrolysis of water includes a ferric oxide support and a plurality of cobalt-containing compound catalysts wherein the plurality of cobalt-containing compound catalysts attach to the surface of the ferric oxide support to improve cluster effect of these cobalt-containing compound catalysts. Moreover, the cobalt-containing compound catalysts have a plurality of gaps between each other to expose a portion of the ferric oxide support. Therefore, during electrolysis of water, a gas generated from water can easily leave the catalyst structure to avoid gas being retained in the catalyst structure. Retained gas may lead to an increase in resistance. Further, because the cobalt-containing compound catalysts of instant disclosure attach to the surface of the ferric oxide support, that may avoid disintegration of catalyst structure when the gas leave, such that it can prolong the lifetime of the catalyst structure.

According to one embodiment of instant disclosure, a method of forming catalyst structure for electrolysis of water includes following steps. 270 mg of ferric chloride ($FeCl_3$) was dissolved in deionized water and 750 µL of 0.5M oxalic acid solution was added to form a first solution. Further, a small amount of sodium hydroxide (NaOH) was added to the first solution to promote a dissociation of ferric chloride. The pH value of the first solution was about 5-6. Next, the first solution was heated to at least 160° C. The heating time was at least 30 minutes. The ferric chloride was reduced by the oxalic acid to produce a precipitate. After the precipitate was treated with filtration, washing and drying, 30-40 mg of ferric oxide ($Fe_2O_3$) was obtained. Finally, the ferric oxide and a cobalt-containing compound catalyst were mixed to form a catalyst structure. The catalyst structure uses the ferric oxide as a support of the cobalt-containing compound catalyst.

According to one embodiment of instant disclosure, using ferric oxide as the catalyst support can avoid the cluster effect of the cobalt-containing compound catalyst wherein the cobalt-containing compound catalyst is cobalt-containing oxide catalyst, cobalt-containing hydroxide catalyst or a combination thereof According to one embodiment of instant disclosure, heating the first solution is by a microwave assisted hydrothermal (MAH) method. The first solution was put into a jar for hydrothermal method and heated with a microwave oven. During the reaction, the temperature of the first solution can be controlled by the output power of the microwave oven which can be adjusted by temperature lines of thermocouples. Compared to a typical hydrothermal method, the required heating time of the MAH method is shorter, the synthesis velocity of MAH method is faster, and the temperature homogeneity of MAH method is better.

Figure 1B:
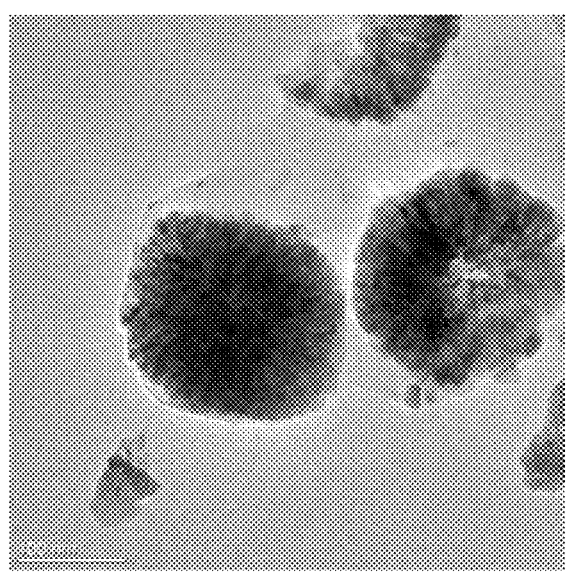
FIG. 1B shows a transmission electron microscope (TEM) image of a ferric oxide support according to one embodiment of the instant disclosure.

Referring now to FIG. 1A, FIG. 1A shows a scanning electron microscope (SEM) image of a ferric oxide support according to one embodiment of the instant disclosure. The shape of ferric oxide support is roughly spherical and an average particle size of the ferric oxide support is 150 nm. Referring now to FIG. 1B, FIG. 1B shows a transmission electron microscope (TEM) image of a ferric oxide support according to one embodiment of the instant disclosure. The ferric oxide support has a nondense structure. Specifically, the nondense structure is a flocculent structure, a fleeced ball-like structure or a steel wool-like structure. The internal structure of the ferric oxide support is porous and the surface of the ferric oxide is uneven as shown in FIG. 1B. The nondense structure is beneficial for cobalt-containing compound catalyst attaching to the ferric oxide support and also beneficial for gas generated during electrolysis of water leaving the ferric oxide support.

According to one embodiment of instant disclosure, mixing the ferric oxide and the cobalt-containing compound catalyst includes the following steps. The ferric oxide and cobalt chloride ($CoCl_2$) were mixed in different weight ratio and oxalic acid was added to form a second solution. The weight ratio of the ferric oxide to the cobalt chloride is 3:55-3:80. In a preferred embodiment, a weight ratio of the ferric oxide to the cobalt chloride is 3:55-3:65. Further, the second solution is adjusted to alkaline. For example, sodium hydroxide was added to the second solution and a pH value of the second solution was adjusted to 9-10. Finally, the second solution was heated wherein the cobalt chloride reacted with alkali to produce cobalt hydroxide ($Co(OH)_2$) which is attached to the surface of the ferric oxide to form the catalyst structure. The cobalt hydroxide is used as catalyst for electrolysis of water. Moreover, the distribution of the cobalt hydroxide catalysts on the surface of the ferric oxide support and a size and an amount of a plurality of gaps between cobalt hydroxide catalysts may be determined by adjusting the weight ratio of the ferric oxide to the cobalt chloride. According to one embodiment of instant disclosure, heating the second solution is by a microwave assisted hydrothermal method. According to the above synthetic methods, the instant disclosure provides a simple, fast and high-yield method of forming catalyst structure. Further, these reactants, for example, ferric chloride and cobalt chloride, include non-noble metals. Compared to typical catalysts including noble metals, the catalyst structure of instant disclosure has lower cost and greater commercial potential.

Figure 2A:
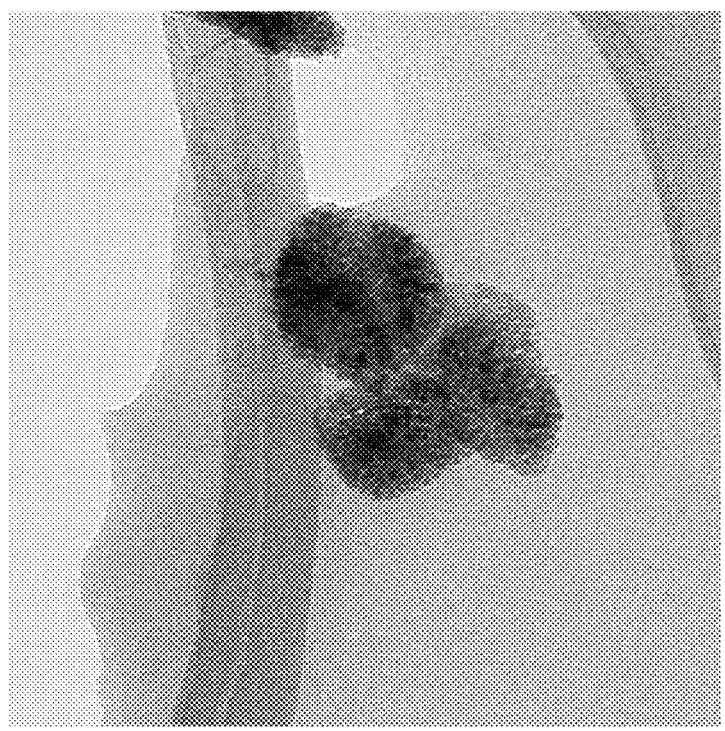
FIG. 2A shows a transmission electron microscope image of a catalyst structure according to one embodiment of the instant disclosure.
Figure 2B:
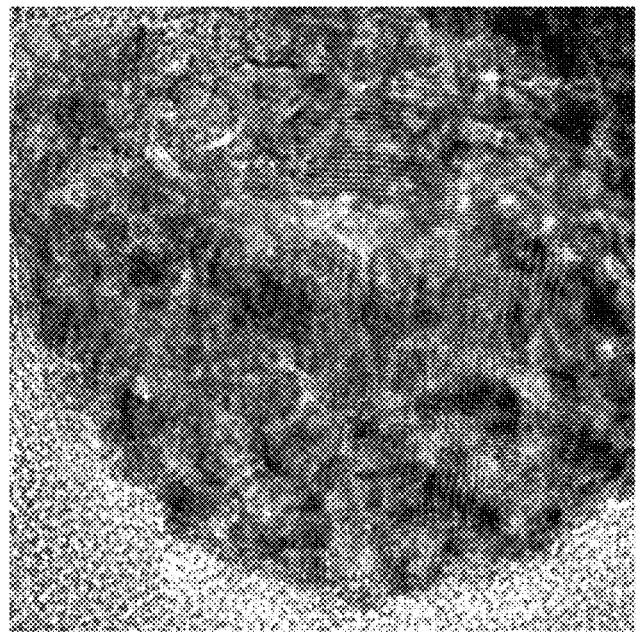
FIG. 2B shows the partial enlargement of FIG. 2A.
Figure 2C:
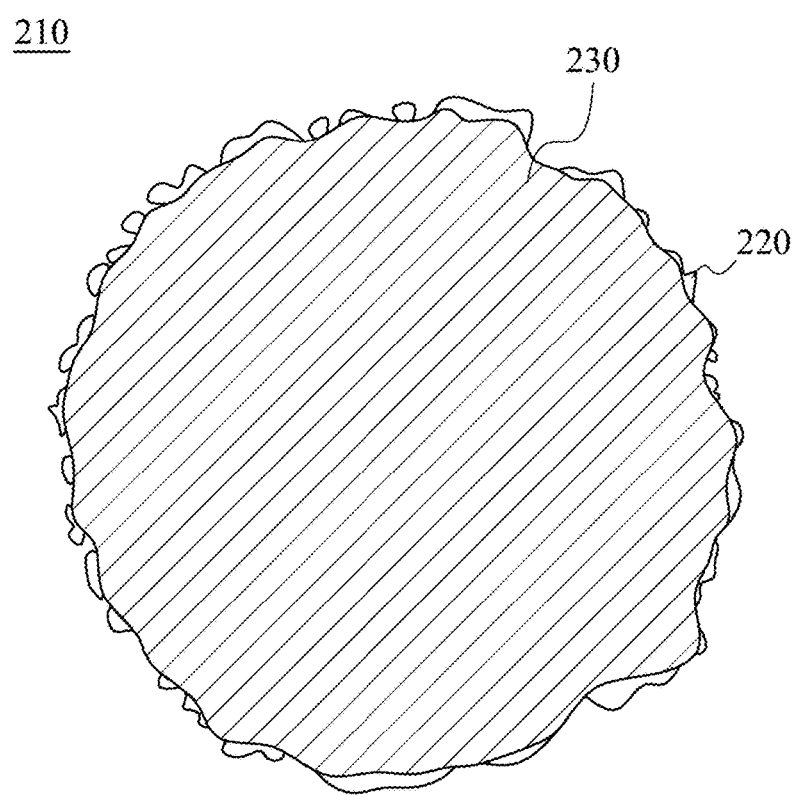
FIG. 2C shows a schematic diagram of a catalyst structure according to one embodiment of the instant disclosure.

Referring now to FIG. 2A and FIG. 2B, FIG. 2A shows a transmission electron microscope image of a catalyst structure according to one embodiment of the instant disclosure and FIG. 2B shows the partial enlargement of FIG. 2A. The catalyst structure shown in FIG. 2A and FIG. 2B is synthesized by ferric oxide and the cobalt chloride wherein the weight ratio of the ferric oxide to the cobalt chloride is 1:20. The black regions shown in FIG. 2A and FIG. 2B represent a plurality of cobalt hydroxide catalysts attaching to the surface of the ferric oxide support. The plurality of cobalt hydroxide catalysts have a plurality of gaps between each other to expose a portion of the ferric oxide support. Therefore, a gas generated from water during electrolysis can easily leave catalyst structure from the gaps. Widths of these gaps are less than about 1 nm. Further, referring now to FIG. 2C, FIG. 2C shows a schematic diagram of a catalyst structure according to one embodiment of the instant disclosure. A catalyst structure 210 is a schematic diagram of the catalyst structure shown in FIG. 2B. As shown in FIG. 2C, a plurality of cobalt hydroxide catalysts 220 attach to a surface of a ferric oxide support 230. The plurality of cobalt hydroxide catalysts 220 have a plurality of gaps between each other to expose a portion of the ferric oxide support 230. In other words, the portion of the ferric oxide support 230 is exposed in between the plurality of cobalt hydroxide catalysts 220.

Figure 3:
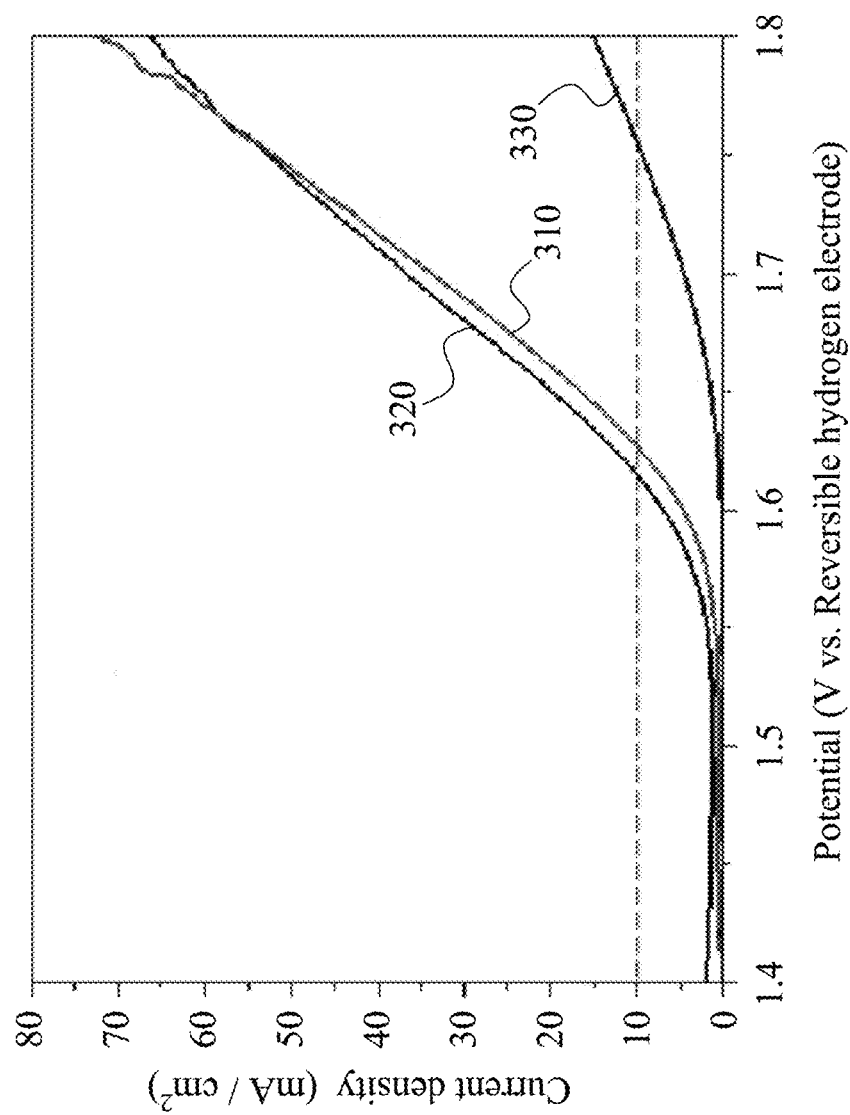
FIG. 3 is a graph showing experimental results of linear scanning voltammetry (LSV) of different catalyst structures for electrolysis of water.

Referring now to FIG. 3, FIG. 3 is a graph showing experimental results of linear scanning voltammetry (LSV) of different catalyst structures for electrolysis of water. The catalyst structure, 1-propanol and water were mixed to form a solution. During the experiment, a moderate amount of the solution was coated on rotating disc electrode (RDE) where occurs oxidation reaction. An electrolyte was 1M sodium hydroxide. The horizontal axis represents a potential with respect to a reversible hydrogen electrode (RHE) and a unit of potential is volt (V). The vertical axis represents a current density and a unit of current density is mA/cm². When the current density reaches 10 mA/cm², the potential value is defined as an onset potential of electrolysis of water. The dash line in FIG. 3 marks the current density at 10 mA/cm². A line 310 shows experimental data of a catalyst structure including only cobalt hydroxide. A line 320 shows experimental data of the catalyst structure shown in FIG. 2A. A line 330 shows a background signal. As shown in FIG. 3, from the point of intersection of the line 310 and the dash line we know that an onset potential of the catalyst structure including only cobalt hydroxide is 1.62V. From the point of intersection of the line 320 and the dash line we know that an onset potential of the catalyst structure of instant disclosure is 1.61V. The reason for that is because the gas generated during electrolysis is not easy to accumulate on the catalyst structure of instant disclosure, the onset potential of the catalyst structure of instant disclosure is lower thereby.

Figure 4:
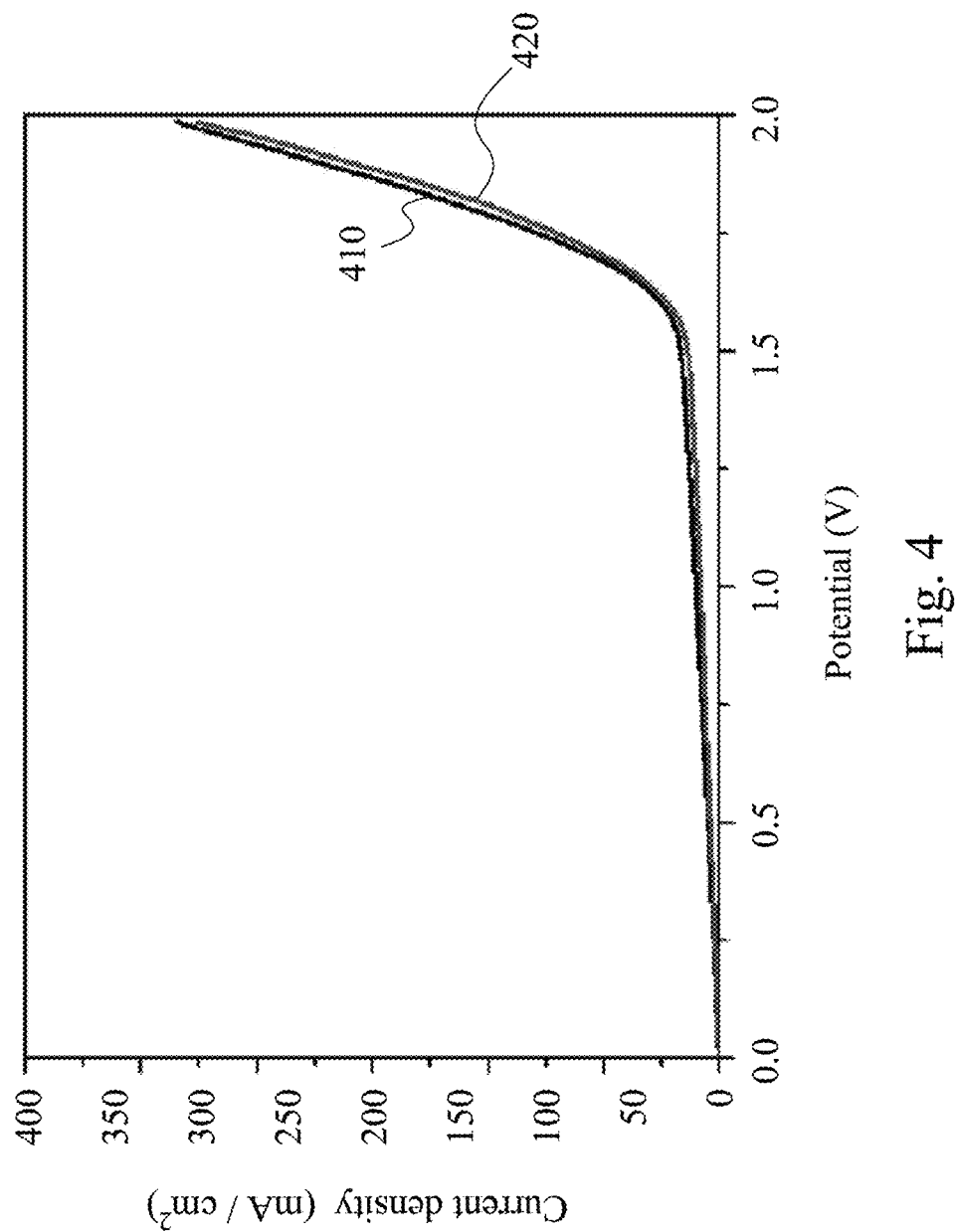
FIG. 4 is a graph showing experimental results of linear scanning voltammetry for a stability test of catalyst structure according to one embodiment of the instant disclosure.

Referring now to FIG. 4, FIG. 4 is a graph showing experimental results of linear scanning voltammetry for a stability test of catalyst structure according to one embodiment of the instant disclosure. The horizontal axis represents a potential and a unit of potential is volt (V). The vertical axis represents a current density and a unit of current density is mA/cm². The catalyst structure of instant disclosure as shown in FIG. 2A is coated on the surface of anode in electrolyzer. By the difference between results before stability test and results after stability test, the stability of the catalyst structure can be measured. A line 410 shows experimental data of the catalyst structure before stability test. A line 420 shows the experimental data of the catalyst structure after stability test. In the stability test, the catalyst structure is treated at 1.8V for 10 hours. As shown in FIG. 4, there is little difference between results before stability test and results after stability test. Thus, the catalyst structure of instant disclosure has good stability. Further, generated oxygen around the anode can be collected by gas collecting method. The amount of generated oxygen can be used to calculate the amount of generated hydrogen. Each 1 cm² of catalyst structure coating on anode can catalyzes the decomposition of water, where more than 5 mL of hydrogen is generated in a minute during electrolysis.

Given above, the instant disclosure provides the catalyst structure produced from non-noble metal reactants and the method of forming the same. These reactants have low cost. The forming process is simple and fast thereby a large number of catalyst structures can be obtained in a short time. The catalyst structure can effectively lower the onset potential of water during electrolysis and have a great potential.

Although the instant disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the instant disclosure without departing from the scope or spirit of the disclosure. In view of the foregoing, it is intended that the instant disclosure cover modifications and variations of this disclosure provided they fall within the scope of the following claims.

What is claimed is:

1. A catalyst structure for electrolysis of water, comprising:
   a ferric oxide support; and
   a plurality of cobalt-containing compound catalysts, wherein the plurality of cobalt-containing compound catalysts attach to a surface of the ferric oxide support, wherein a material of the plurality of cobalt-containing compound catalysts is cobalt hydroxide.

2. The catalyst structure of claim 1, wherein the ferric oxide support has a nondense structure.

3. The catalyst structure of claim 2, wherein the nondense structure is a flocculent structure, a fleeced ball-like structure or a steel wool-like structure.

4. The catalyst structure of claim 1, wherein a portion of the ferric oxide support is exposed in between the plurality of cobalt-containing compound catalysts.

* * * * *